Patented June 2, 1942

2,285,032

UNITED STATES PATENT OFFICE 2,285,032

AGE RESISTING RUBBER COMPOSITION

Joseph R. Ingram, Nitro, W. Va., assignor to Monsanto Chemical Company, St. Louis, Mo., a corporation of Delaware No Drawing. Application November 5, 1938, Serial No. 239,145

20 Claims. (Cl. 260—809)

The present invention relates to the art of rubber manufacture, and particularly relates to rubber compositions which resist deterioration due to aging or to exposure to the atmosphere. It has long been known that such deterioration can be greatly retarded by treating the rubber before or after vulcanization with certain substances known as age-resisters or antioxidants. One object of this invention is to provide a superior class of antioxidants for rubber.

The age resisting characteristics of a vulcanized rubber product can be readily ascertained by subjecting samples of the vulcanized product in a bomb to the action of air or oxygen under elevated pressure. The aged rubber samples are then examined and tested and the test data compared with the results obtained on testing the unaged rubber samples. The deterioration in properties effected as a result of the oxidation is indicative of the result that would normally be expected of that particular stock during actual service. Such a test produces an effect on a vulcanized rubber stock comparable with that resulting from several years of natural aging of the rubber depending upon the conditions of the test.

In accordance with the present invention it has been discovered that the reaction products of indene and secondary diaryl amines are effective in retarding the deterioration of rubber. The secondary diaryl amines which are employed in the preparation of the preferred class of antioxidants comprise broadly compounds containing at least one secondary amino group and at least two aryl groups although other constituents may be present as for example, additional secondary amino groups, additional aryl or substituted aryl groups and the like.

In its preferred embodiment the present invention comprises the reaction products of indene and those secondary diaryl amines which contain a secondary nitrogen atom linked directly to two different carbon atoms each of which is part of an aromatic ring, said aromatic ring being chosen from the benzene and naphthalene series. It is further preferred that the secondary diaryl amines employed in the preparation of the new class of antioxidants contain neither acidic nor primary amino constituents.

Typical examples of secondary diaryl amines which may be reacted with indene to produce members of the preferred class of antioxidants are diphenyl amine, phenyl butyl phenyl amine, phenyl alpha naphthylamine, phenyl beta naphthylamine, dibenzyl amine, phenyl benzyl amine, biphenyl phenyl amine, diphenyl p-phenylene diamine, p-phenoxy phenyl beta naphthylamine, di - beta - naphthylamine, di-beta-naphthyl-p-phenylene diamine, tolyl naphthyl amine and equivalents and analogues thereof.

The reactions of indene and secondary diaryl amines are advantageously carried out in the presence of a condensation catalyst as for example hydrochloric acid, hydrobromic acid, aluminum chloride and sulphuric acid although other suitable catalysts may be employed where convenient or desirable. The simple expedient of agitating the reacting ingredients with the catalyst in an inert solvent is one convenient means of effecting the desired reactions. The application of heat, although unnecessary, greatly speeds up the rate of reaction and consequently shortens the reaction time. The use of inert organic solvents, as stated above, affords a convenient means of bringing the reacting ingredients and catalyst into intimate association with each other but their use is by no means essential and it has been found that, if desired, the solvent may be omitted altogether. It is, of course, obvious that other organic solvents than those mentioned in the preparations hereinafter described, may be employed, as well as other means and conditions of effecting the reactions. Other proportions of reacting ingredients and other variations may be introduced without departing from the spirit of the present invention.

The chemical structure of the products obtained by reacting secondary diaryl amines with indene is not known but the reactions are believed to proceed in a large measure similar to that between indene and phenols or thiophenols in accordance with which the new class of antioxidants would comprise principally compounds of the structure

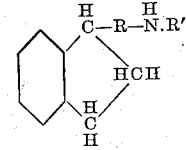

in which R and R' comprise aryl radicals. However, the present invention is not limited to any assumption as to chemical structure but pertains broadly to the products obtainable by reacting indene with a secondary diaryl amine.

The following specific examples are given to show the preparation of the preferred class of materials and are intended to illustrate the invention and not to limit the same.

EXAMPLE I 33.8 parts by weight (substantially 0.2 molecular proportion) of diphenyl amine, 23.2 parts by weight (substantially 0.2 molecular proportion) of indene and a suitable catalyst and solvent, for example, substantially 27 parts by weight of anhydrous aluminum chloride and substantially 129 parts by weight of carbon disulfide were placed in a suitable reactor and the mixture heated to refluxing temperature for three hours. The carbon disulfide was then removed, preferably by distillation, and the aluminum chloride removed by dissolving in either a dilute acid solution or a caustic alkali solution. For example a quantity of dilute sodium hydroxide sufficient to form sodium aluminate was added to the reaction mixture and the oily layer extracted with a suitable organic solvent, such as benzene which was subsequently removed, preferably by distillation. The residue remaining after removal of the aluminum chloride and solvent was heated to 210° C. under 4 mm. pressure to remove unreacted ingredients, the vapor temperature reaching 150° C. The residue comprising the preferred reaction product was incorporated into rubber and found to exhibit desirable antioxidant properties as shown in Table I.

EXAMPLE II

Different proportions of the reacting ingredients may be employed when desired. Thus the proportions may be so adjusted that the amine is substantially completely reacted as shown in the following example. 22 parts by weight (substantially 0.1 molecular proportion) of phenyl beta naphthylamine, 23 parts by weight (substantially 0.2 molecular proportion) of indene, and a suitable catalyst and solvent, for example, substantially 15 parts by weight of anhydrous aluminum chloride and substantially 129 parts by weight of dry carbon disulfide were placed in a suitable container and the mixture heated to refluxing temperature for eight hours. At the end of this period the carbon disulfide was removed, preferably by distillation, and a mixture of dilute hydrochloric acid and benzene added to the residue remaining, and the mixture gently heated until complete solution was effected. The benzene layer was separated and washed free of acid and the benzene removed, preferably by distillation, after which the residue was heated to 230° C. under 4 mm. pressure whereupon it was found that complete reaction between the ingredients had taken place. The reaction product so obtained was found to exhibit desirable antioxidant properties as shown in Table I.

EXAMPLE III

Phenyl beta naphthylamine was replaced by phenyl alpha naphthylamine and reacted with indene substantially by the procedure described in Example II. 120 parts by weight of 20% sodium hydroxide solution was employed to remove the aluminum chloride and again it was found upon heating the crude reaction product under reduced pressure that substantially a complete reaction between the ingredients had taken place. The product is obtained likewise exhibited desirable antioxidant properties as shown in Table I.

EXAMPLE IV 26 parts by weight (substantially 0.1 molecular proportion) of diphenyl-p-phenylene diamine, 23 parts by weight (substantially 0.2 molecular proportion) of indene, and a suitable catalyst and solvent, for example, substantially 15 parts by weight of anhydrous aluminum chloride and substantially 129 parts by weight of carbon disulfide were placed in a suitable reactor and the mixture heated to refluxing temperature for eight hours. The material in the reaction vessel, after removal of the carbon disulfide, was digested with a mixture of 20% aqueous sodium hydroxide solution and benzene. The benzene layer was separated, washed free of alkali, and unreacted diphenyl-p-phenylene diamine removed by precipitating with petroleum ether. The desired reaction product, after removal of the precipitated diphenyl-p-phenylene diamine and the solvent, was obtained as a resinous mass. It exhibited desirable antioxidant properties typical of the preferred class of materials as shown in Table I.

EXAMPLE V 31.2 parts by weight of p-phenoxy-phenyl, beta naphthylamine (substantially 0.1 molecular proportion), 23 parts by weight (substantially 0.2 molecular proportion) of indene, and a suitable catalyst and solvent, for example, substantially 15 parts by weight of anhydrous aluminum chloride and substantially 129 parts by weight of carbon disulfide were placed in a suitable reactor and the mixture heated to refluxing temperature for seven hours. The carbon disulfide was removed and the residue digested with 20% aqueous sodium hydroxide and benzene mixture and the benzene layer separated and washed substantially as described in foregoing examples. The desired reaction product obtained after removal of the benzene showed desirable antioxidant properties as set forth in Table I.

As a specific embodiment of the invention showing the anti-oxidant or age-resisting properties of indene-secondary diaryl amine reaction products and which is intended to illustrate the invention but not to limit the same, rubber stocks were compounded comprising

|  | Stock (parts by weight) | | | | |
| --- | --- | --- | --- | --- | --- |
|  | A | B | C | D | E |
| Smoked sheets of rubber | 100 | 100 | 100 | 100 | 100 |
| Carbon black | 50 | 50 | 50 | 50 | 50 |
| Zinc oxide | 5 | 5 | 5 | 5 | 5 |
| Sulfur | 3 | 3 | 3 | 3 | 3 |
| Pine tar | 2 | 2 | 2 | 2 | 2 |
| Stearic acid | 3 | 3 | 3 | 3 | 3 |
| Benzothiazyl thiobenzoate | .8 | .8 | .8 | .8 | .8 |
| Diphenyl guanidine | .2 | .2 | .2 | .2 | .2 |
| Indene-diphenyl amine reaction product | 1.0 | | | | |
| Indene-phenyl-beta-naphthylamine reaction product | | 1.0 | | | |
| Indene-phenyl-alpha-naphthylamine reaction product | | | 1.0 | | |
| Indene-diphenyl-p-phenylene diamine reaction product | | | | 1.0 | |
| Indene-p-phenoxy phenyl, beta-naphthylamine reaction product | | | | | 1.0 |

The rubber stocks so compounded were vulcanized in a press at the temperature of thirty pounds steam pressure per square inch and the modulus and tensile properties of the cured rubber stocks compared to those of the same cured stocks which had been aged in an oxygen bomb at 70° C. and 300 pounds oxygen pressure for 96 and 120 hours respectively. The comparison of the aged and unaged stocks is given in Table I.

*Table I*

| Stock | Cure time in minutes | Hours oxygen bomb aged | Modulus of elasticity in lbs./in.² at elongations of— 200% | Modulus of elasticity in lbs./in.² at elongations of— 400% | Tensile at break in lbs./in.² | Ult. elong., percent |
|---|---|---|---|---|---|---|
| A | 60 | 0 | 1,125 | 2,640 | 3,730 | 535 |
| A | 60 | 96 | 1,110 | 2,315 | 2,315 | 400 |
| A | 60 | 120 | 970 | | 1,860 | 380 |
| B | 60 | 0 | 1,010 | 2,685 | 3,700 | 540 |
| B | 60 | 96 | 1,025 | | 2,155 | 390 |
| B | 60 | 120 | 895 | | 1,630 | 355 |
| C | 60 | 0 | 1,065 | 2,775 | 3,735 | 520 |
| C | 60 | 96 | 975 | | 1,870 | 370 |
| C | 60 | 120 | 855 | | 1,310 | 320 |
| D | 60 | 0 | 1,120 | 2,890 | 3,900 | 535 |
| D | 60 | 96 | 1,205 | | 2,390 | 380 |
| D | 60 | 120 | 1,055 | | 1,800 | 355 |
| E | 60 | 0 | 1,090 | 2,860 | 4,200 | 560 |
| E | 60 | 96 | 870 | 1,930 | 2,000 | 410 |
| E | 60 | 120 | 755 | | 1,400 | 350 |
| A | 75 | 0 | 1,150 | 2,840 | 3,675 | 495 |
| A | 75 | 96 | 1,275 | | 2,380 | 360 |
| A | 75 | 120 | 1,035 | | 1,705 | 320 |
| B | 75 | 0 | 1,130 | 2,940 | 3,900 | 515 |
| B | 75 | 96 | 1,105 | | 2,060 | 355 |
| B | 75 | 120 | 1,040 | | 1,490 | 295 |
| C | 75 | 0 | 1,170 | 2,950 | 3,830 | 510 |
| C | 75 | 96 | 1,065 | | 1,700 | 320 |
| C | 75 | 120 | 945 | | 1,200 | 269 |
| D | 75 | 0 | 1,180 | 3,025 | 3,750 | 485 |
| D | 75 | 96 | 1,340 | | 2,200 | 320 |
| D | 75 | 120 | 1,175 | | 1,720 | 310 |
| E | 75 | 0 | 1,160 | 3,010 | 4,200 | 540 |
| E | 75 | 96 | 965 | | 1,825 | 370 |
| E | 75 | 120 | 795 | | 1,300 | 310 |
| A | 90 | 0 | 1,180 | 2,845 | 3,700 | 505 |
| A | 90 | 96 | 1,200 | | 2,125 | 330 |
| A | 90 | 120 | 1,110 | | 1,555 | 290 |
| B | 90 | 0 | 1,150 | 2,900 | 3,760 | 510 |
| B | 90 | 96 | 1,195 | | 1,750 | 300 |
| B | 90 | 120 | 1,055 | | 1,375 | 270 |
| C | 90 | 0 | 1,190 | 3,000 | 3,830 | 500 |
| C | 90 | 96 | 1,120 | | 1,510 | 290 |
| C | 90 | 120 | 935 | | 1,145 | 255 |
| D | 90 | 0 | 1,190 | 3,095 | 3,625 | 460 |
| D | 90 | 96 | 1,400 | | 2,075 | 300 |
| D | 90 | 120 | 1,145 | | 1,630 | 280 |
| E | 90 | 0 | 1,115 | 2,950 | 3,950 | 520 |
| E | 90 | 96 | 930 | | 1,725 | 355 |
| E | 90 | 120 | 850 | | 1,250 | 300 |

The above data show the desirable antioxidant properties of the preferred class of materials when incorporated in a typical rubber stock and show that rubber compositions containing small proportions of the preferred class of materials markedly resist the deteriorating influences of heat and oxidation. In addition the cured rubber products were tested on a flexing machine as set forth by L. V. Cooper, Analytical Edition of Industrial and Engineering Chemistry, vol. 2, No. 4, 1930, pages 391–394. Tests were carried out on the unaged samples and after aging 7 days at 70° C. whereby it was found that rubber products containing small proportions of the preferred class of materials are resistant to flex cracking.

Obviously practice of this invention is not limited to the specific compositions given above, such compositions being merely illustrative of the manner of employing the antioxidants or age-resisters of this invention. The antioxidants or age-resisters may be employed in different proportions than herein described and in conjunction with other vulcanizing agents than those specifically disclosed, for this invention is applicable generally to pure rubber or rubber compositions of the most varied nature. Furthermore, the preferred class of materials may be employed in rubber stocks in conjunction with other accelerators than those specifically shown with varying differences in tensile and modulus properties but still exhibiting the desirable properties of the class.

It is to be understood that the term "treating" as employed in the appended claims is used in a generic sense to include either the incorporating of the preferred class of materials into the rubber by milling or similar process, or their addition to the rubber latex before its coagulation, or the application thereof to the surface of a mass of crude or vulcanized rubber. The term "a rubber" is employed in the claims to define a vulcanizable plastic material which possesses high extensibility under load coupled with the property of forcibly retracting to approximately its original size and shape after the load is removed. Such products include, for example, india rubber, reclaimed rubber, balata, gutta percha and other natural or synthetic vulcanizable products which deteriorate upon aging whether or not admixed with fillers, pigments or accelerating agents.

The present invention is limited solely by the claims attached hereto as part of the present specification.

What is claimed is:

1. The method of preserving a rubber which comprises treating a rubber with a product obtained by reacting indene and a secondary diaryl amine in which only secondary amino groups are present in the presence of a condensation catalyst.

2. The method of preserving a rubber which comprises treating a rubber with a product obtained by heating indene and a secondary diaryl amine in which only secondary amino groups are present in the presence of a condensation catalyst.

3. The method of preserving a rubber which comprises treating a rubber with a product obtained by reacting indene and a secondary diaryl amine in which only secondary amino groups are present and wherein a secondary nitrogen atom is linked directly to two different carbon atoms each of which is part of an aromatic ring in the presence of a condensation catalyst.

4. The method of preserving a rubber which comprises treating a rubber with a product obtained by associating indene and a secondary diaryl amine in which only secondary amino groups are present and wherein a secondary nitrogen atom is linked directly to two different carbon atoms each of which is part of an aromatic ring, and effecting a reaction between the indene and said amine by heating in the presence of a condensation catalyst.

5. The method of preserving a rubber which comprises treating a rubber with a product obtained by reacting indene and a secondary diaryl amine in which only secondary amino groups are present and wherein the aryl groups are chosen from the benzene and naphthalene series in the presence of a condensation catalyst.

6. The method of preserving a rubber which comprises treating a rubber with a product obtained by heating indene and a secondary diaryl amine in which only secondary amino groups are present and wherein the aryl groups are chosen from the benzene and naphthalene series in the presence of a condensation catalyst.

7. The method of preserving india rubber which comprises treating india rubber with a product obtained by associating indene and a secondary diaryl amine in which only secondary amino groups are present and wherein a secondary nitrogen atom is linked directly to two different carbon atoms each of which is a member of an aryl group chosen from the benzene and naphthalene series, and effecting a reaction between the indene and said amine by heating in the presence of a condensation catalyst.

8. The method of preserving a rubber which comprises treating a rubber with a product obtained by associating indene and diphenyl amine and effecting a reaction between the indene and said amine by heating in the presence of a condensation catalyst.

9. The method of preserving a rubber which comprises treating a rubber with a product obtained by associating indene and diphenyl p-phenylene diamine and effecting a reaction between the indene and said amine by heating in the presence of a condensation catalyst.

10. The method of preserving a rubber which comprises treating a rubber with a product obtained by associating indene and phenyl beta naphthylamine and effecting a reaction between the indene and said amine by heating in the presence of a condensation catalyst.

11. The vulcanized rubber product obtained by heating a rubber and sulfur in the presence of a product obtained by reacting indene and a secondary diaryl amine in which only secondary amino groups are present in the presence of a condensation catalyst.

12. The vulcanized rubber product obtained by heating a rubber and sulfur in the presence of a product obtained by heating indene and a secondary diaryl amine in which only secondary amino groups are present in the presence of a condensation catalyst.

13. The vulcanized rubber product obtained by heating india rubber and sulfur in the presence of a product obtained by reacting indene and a secondary diaryl amine in which only secondary amino groups are present and wherein a secondary nitrogen atom is linked directly to two different carbon atoms each of which is part of an aromatic ring in the presence of a condensation catalyst.

14. The vulcanized rubber product obtained by heating a rubber and sulfur in the presence of a product obtained by associating indene and a secondary diaryl amine in which only secondary amino groups are present and wherein a secondary nitrogen atom is linked directly to two different carbon atoms each of which is part of an aromatic ring, and effecting a reaction between the indene and said amine by heating in the presence of a condensation catalyst.

15. The vulcanized rubber product obtained by heating a rubber and sulfur in the presence of a product obtained by reacting indene and a secondary diaryl amine in which only secondary amino groups are present and wherein the aryl groups are chosen from the benzene and naphthalene series in the presence of a condensation catalyst.

16. The vulcanized rubber product obtained by heating a rubber and sulfur in the presence of a product obtained by heating indene and a secondary diaryl amine in which only secondary amino groups are present and wherein the aryl groups are chosen from the benzene and naphthalene series in the presence of a condensation catalyst.

17. The vulcanized rubber product obtained by heating a rubber and sulfur in the presence of a product obtained by associating indene and a secondary diaryl amine in which only secondary amino groups are present and wherein a secondary nitrogen atom is linked directly to two different carbon atoms each of which is a member of an aryl group chosen from the benzene and naphthalene series, and effecting a reaction between the indene and said amine by heating in the presence of a condensation catalyst.

18. The vulcanized rubber product obtained by heating a rubber and sulfur in the presence of a product obtained by associating indene and diphenyl amine and effecting a reaction between the indene and said amine by heating in the presence of a condensation catalyst.

19. The vulcanized rubber product obtained by heating a rubber and sulfur in the presence of a product obtained by associating indene and diphenyl p-phenylene diamine and effecting a reaction between the indene and said amine by heating in the presence of a condensation catalyst.

20. The vulcanized rubber product obtained by heating a rubber and sulfur in the presence of a product obtained by associating indene and phenyl beta naphthylamine and effecting a reaction between the indene and said amine by heating in the presence of a condensation catalyst.

JOSEPH R. INGRAM.

DISCLAIMER 2,285,032.—*Joseph R. Ingram*, Nitro, W. Va. AGE RESISTING RUBBER COMPOSITION. Patent dated June 2, 1942. Disclaimer filed March 27, 1943, by the assignee, *Monsanto Chemical Company.*

Hereby enters this disclaimer to claims 1, 2, 3, 4, 5, 6, 7, 8, 11, 12, 13, 14, 15, 16, 17, and 18.

[*Official Gazette May 4, 1943.*]